F. W. SMITH.
ANTISLIP DEVICE.
APPLICATION FILED DEC. 4, 1918.
1,315,745.
Patented Sept. 9, 1919.
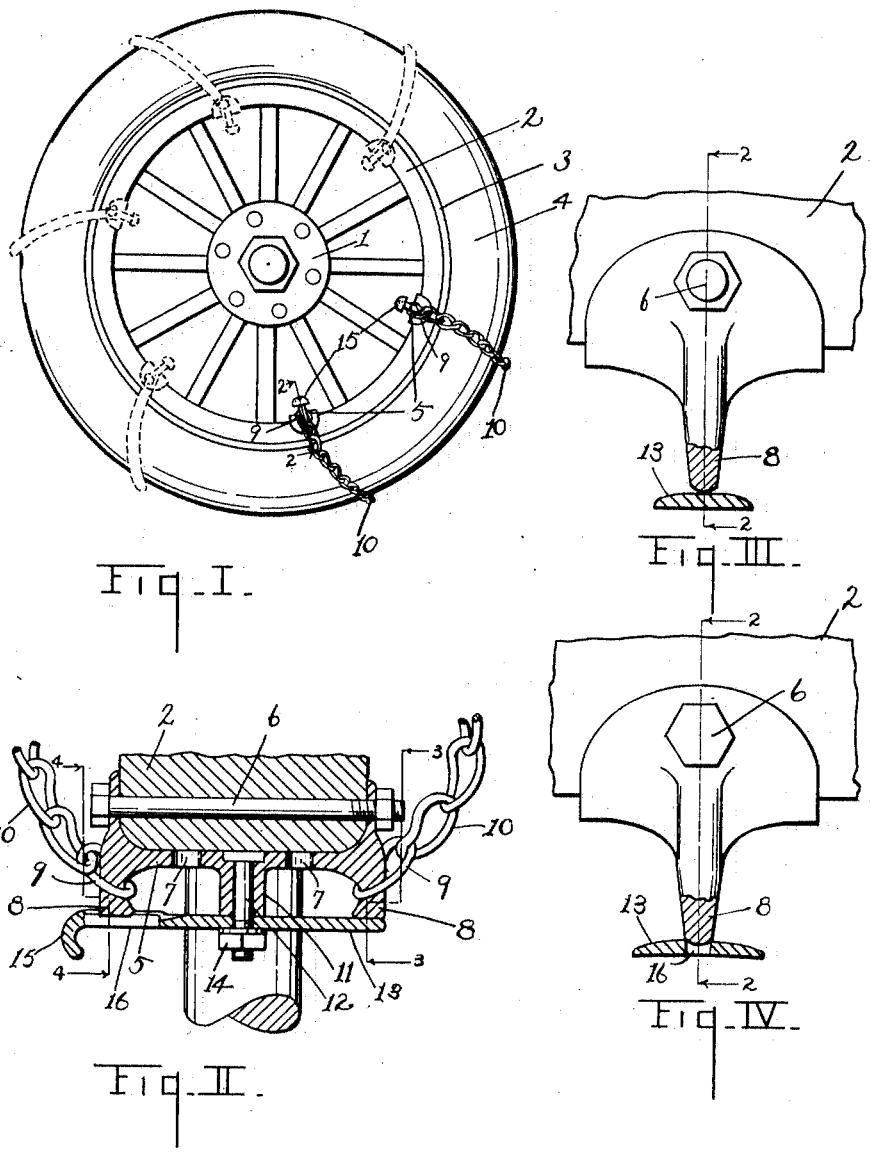
Inventor
FRANK W. SMITH

UNITED STATES PATENT OFFICE.

FRANK W. SMITH, OF KALAMAZOO, MICHIGAN.

ANTISLIP DEVICE.

1,315,745.   Specification of Letters Patent.   Patented Sept. 9, 1919.

Application filed December 4, 1918. Serial No. 265,207.

*To all whom it may concern:*

Be it known that I, FRANK W. SMITH, a citizen of the United States, residing at the city and county of Kalamazoo, State of Michigan, have invented certain new and useful Improvements in Antislip Devices, of which the following is a specification.

This invention relates to improvements in anti-slip devices.

The main objects of this invention are:

First, to provide an improved anti-slip device which is well adapted for use on trucks and which enables the tread members being readily applied to or removed from a wheel without jacking up the wheel.

Second, to provide an improved anti-slip device which is strong and durable and at the same time economical to produce and easily applied to the felly of a wheel.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a wheel equipped with my improved anti-slip devices, a portion of them being indicated by dotted lines.

Fig. II is an enlarged detail transverse section on a line corresponding to line 2—2 of Figs. I, III and IV.

Fig. III is a detail view partially in section on a line corresponding to line 3—3 of Fig. II.

Fig. IV is a detail view partially in section on a line corresponding to line 4—4 of Fig. II.

In the drawing similar reference characters refer to similar parts throughout the several views.

Referring to the drawing, 1 represents the wheel of a motor vehicle provided with a felly 2, rim 3 and tire 4, the parts being shown conventionally as the details thereof form no part of my present invention.

The yoke-like end members 5 are adapted to fit over the felly as shown in Fig. II and are preferably secured thereto by means of bolts 6, or where it is not convenient to arrange bolts through the rim, by screws disposed in the holes 7.

The member 5 is provided with lugs 8 with which links 9 of the tread chain 10 may be engaged. These lugs are preferably quite short and substantially straight but of such size as to permit the ready engagement and disengagement of other links of the tread chain therewith.

Between the lugs is a post 11 having a pivot bolt 12 disposed therethrough to engage the guard bar 13. The guard bar is retained on the pivot by means of the nut 14.

For convenience in manipulation one end of the guard bar is turned up at 15 and to retain it in coacting relation to the lugs it is provided with a keeper opening 16 adapted to receive one of the lugs as shown in Fig. IV. The bar also has sufficient resiliency to permit its being sprung over the lug to engage the keeper therewith and swinging over the other lug prevent either end of the tread chain being disengaged. When, however, it is desired to remove the tread chain the guard bar may be swung from its closed position by striking it with a wrench, or may be disengaged by swinging by means of the hands or may be kicked to or from engaging position.

The rim members are designed to be left mounted upon the rim and are compact and do not seriously disfigure or encumber the rim when the tread chains are removed. The chains may be quickly applied to or removed from the wheel as occasion may require.

I have not attempted to illustrate or describe certain modifications or adaptations to other types of rims and wheels as I believe the disclosure made will enable those skilled in the art to which this invention relates to embody or adapt the same as may be desired.

Having thus described my invention, what I claim as new and desire to secure by Letters Patent, is:

1. In a device of the class described, the combination of a felly member provided with projecting lugs adapted to receive links of a tread chain and with a post disposed between said lugs, a guard bar pivot bolt disposed through said post, and a guard bar mounted on said pivot to swing over the ends of said lugs, said guard bar being provided with a keeper coacting with one of said lugs.

2. In a device of the class described, the combination of a felly member provided with projecting lugs adapted to receive links of a tread chain and with a post disposed between said lugs, a guard bar pivot bolt disposed through said post, and a guard bar mounted on said pivot to coact with both.

3. In a device of the class described, the combination of a felly member provided with projecting lugs adapted to receive links of a tread chain, a guard bar pivot disposed between said lugs, and a guard bar mounted on said pivot to swing over the ends of said lugs, said guard bar being provided with a keeper coacting with one of said lugs.

In witness whereof, I have hereunto set my hand and seal in the presence of two witnesses.

F. W. SMITH. [L. S.]

Witnesses:
 LUELLA G. GREENFIELD,
 MARGARET L. GLASGOW.